(12) United States Patent
Xu et al.

(10) Patent No.: US 12,294,730 B2
(45) Date of Patent: *May 6, 2025

(54) PRUNING METHODS FOR NEURAL NETWORK BASED VIDEO CODING

(71) Applicant: TENCENT AMERICA LLC, Palo Alto, CA (US)

(72) Inventors: Xiaozhong Xu, State College, PA (US); Wei Jiang, San Jose, CA (US); Shan Liu, San Jose, CA (US); Wei Wang, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,986

(22) Filed: Jun. 20, 2023

(65) Prior Publication Data

US 2023/0336762 A1 Oct. 19, 2023

Related U.S. Application Data

(63) Continuation of application No. 17/362,184, filed on Jun. 29, 2021, now Pat. No. 11,765,376.

(Continued)

(51) Int. Cl.
*H04N 7/12* (2006.01)
*G06N 3/082* (2023.01)
(Continued)

(52) U.S. Cl.
CPC ........... *H04N 19/463* (2014.11); *G06N 3/082* (2013.01); *H04N 19/172* (2014.11);
(Continued)

(58) Field of Classification Search
CPC .... H04N 19/80; H04N 19/117; H04N 19/174; H04N 19/463; H04N 9/82; H04N 19/176;
(Continued)

(56) References Cited

U.S. PATENT DOCUMENTS

2013/0170542 A1 7/2013 Sato
2014/0016708 A1 1/2014 Wang
(Continued)

FOREIGN PATENT DOCUMENTS

WO 2016/199330 A1 12/2016
WO 2019/088657 A1 5/2019

OTHER PUBLICATIONS

Hujun Yin, et al., "AHG9: Adaptive convolutional neural network loop filter ," Joint Video Experts Team (JVET) of ITU-T SG 16 WP 3 and ISO/IEC JTC 1/SC 29/WG 11, 13$^{th}$ Meeting: Marrakesh, Jan. 2019, Document: JVET-M0566, 11 pages total.

(Continued)

*Primary Examiner* — Gims S Philippe
(74) *Attorney, Agent, or Firm* — Sughrue Mion, PLLC (57) ABSTRACT

A pruning method of neural network based video coding of a current block of a picture of a video sequence is performed by at least one processor and includes categorizing parameters of a neural network into groups, setting a first index to indicate that a first group of the groups is to be pruned, and a second index to indicate that a second group of the groups is not to be pruned, and transmitting, to a decoder, the set first index and the set second index. Based on the transmitted first index and the transmitted second index, the current block is processed using the parameters of which the first group of the groups is pruned.

12 Claims, 9 Drawing Sheets

Related U.S. Application Data (60) Provisional application No. 63/089,481, filed on Oct. 8, 2020.

(51) Int. Cl.
  *H04N 19/172* (2014.01)
  *H04N 19/174* (2014.01)
  *H04N 19/176* (2014.01)
  *H04N 19/463* (2014.01)
  *H04N 19/80* (2014.01)

(52) U.S. Cl.
  CPC ......... *H04N 19/174* (2014.11); *H04N 19/176* (2014.11); *H04N 19/80* (2014.11)

(58) Field of Classification Search
  CPC ........ H04N 19/90; H04N 19/70; G06N 3/082; G06N 3/045
  USPC .................................................... 375/240.24
  See application file for complete search history.

(56) References Cited

U.S. PATENT DOCUMENTS

| | | | |
|---|---|---|---|
| 2016/0227172 A1* | 8/2016 | Safaei | G06T 19/006 |
| 2016/0227229 A1* | 8/2016 | Wadsworth | H04N 19/40 |
| 2018/0114114 A1 | 4/2018 | Molchanov | |
| 2018/0285382 A1 | 10/2018 | Mehta | |
| 2018/0332284 A1 | 11/2018 | Liu et al. | |
| 2019/0130271 A1 | 5/2019 | Narang et al. | |
| 2019/0238835 A1 | 8/2019 | Lee | |
| 2019/0279089 A1* | 9/2019 | Wang | G06N 3/048 |
| 2019/0306494 A1 | 10/2019 | Chang et al. | |
| 2020/0104716 A1* | 4/2020 | Venkatesha | G06N 3/082 |
| 2020/0143249 A1 | 5/2020 | Georgiadis | |
| 2020/0351509 A1 | 11/2020 | Lee | |
| 2021/0133538 A1 | 5/2021 | Troy | |
| 2021/0287074 A1 | 9/2021 | Coenen | |
| 2021/0397965 A1* | 12/2021 | Zhang | H03M 7/3059 |
| 2022/0116591 A1 | 4/2022 | Huo | |
| 2022/0232240 A1 | 7/2022 | Wang | |

OTHER PUBLICATIONS

Japanese Office Action issued Jul. 25, 2023, in Application No. 2022-537382.

Han Zhu, et al., "Residual Convolutional Neural Network Based In-Loop Filter With Intra and Inter Frames Processed Respectively for AVS3", 6 pages, Tencent Media Lab, Shenzhen, China.

Yingbin Wang, et al., "CE10: Dense Residual Convolutional Neural Network based In-Loop Filter (Tests 2.5 and 2.7)", JVET-O0101-v2, Joint Video Experts Team (JVET) of ITU-T SG 16 WP 3 and ISO/IEC JTC 1/SC 29/WG 11, 15th Meeting, Jul. 3-12, 2019, pp. 1-4, Gothenburg, SE.

Written Opinion of the International Searching Authority dated Nov. 2, 2021 in International Application No. PCT/US21/44904.

Shan Liu, et al., "Methodology and reporting template for neural network coding tool testing", JVET-T0041-v4, Joint Video Experts Team (JVET) of ITU-T SG 16 WP 3 and ISO/IEC JTC 1/SC 29, 20th Meeting: by teleconference, Oct. 7-16, 2020, 13 pages.

International Search Report dated Nov. 2, 2021 in International Application No. PCT/US21/44904.

Cheung Auyeung, et al., "AHG11: A Case Study to Reduce Computation of Neural Network based In- Loop Filter by Pruning", JVET-T0057_r2, Joint Video Experts Team (JVET) of ITU-T SG 16 WP 3 and ISO/IEC JTC 1/SC 29, 20th Meeting, by teleconference, Oct. 7-16, 2020, pp. 1-9.

Shan Liu, et al., "JVET AHG report: Neural Networks in Video Coding (AHG9)", JVET-J0009-v1, Joint Video Experts Team (JVET) of ITU-T SG 16 WP 3 and ISO/IEC JTC 1/SC 29/WG 11, 10th Meeting, Apr. 10-20, 2018, pp. 1-3, San Diego, US.

Dong Liu, et al., "Deep Learning-Based Technology in Responses to the Joint Call for Proposals on Video Compression with Capability beyond HEVC", IEEE Transactions on Circuits and Systems for Video Technology, 2019, pp. 1-14.

Yiming Li, et al., "Methodology and reporting template for neural network coding tool testing", JVET-M1006-v1, Joint Video Experts Team (JVET) of ITU-T SG 16 WP 3 and ISO/IEC JTC 1/SC 29/WG 11, 13th Meeting, Jan. 9-18, 2019, 4 pages, Marrakech, MA.

Philipp Helle et al., "Intra Picture Prediction for Video Coding with Neural Networks", 2019 Data Compression Conference (DCC), 2019, pp. 448-457, Retrieved from: URL: <https://ieeexplore.ieee.org/document/8712653> (10 pages total).

Extended European Search Report dated Mar. 11, 2024 in Application No. 21878167.2.

Benjamin Bross, et al.," Versatile Video Coding (Draft 10)", Joint Video Experts Team (JVET) of ITU-T SG 16 WP 3 and ISO/IEC JTC 1/SC 29/WG 11, 19th Meeting, Jun. 22-Jul. 1, 2020, (548 pages).

Jianle Chen, et al., Algorithm description for versatile video Coding and Test Model 10 (VTM 10), Joint Video Experts Team (JVET) of ITU-T SG 16 WP 3 and ISO/IEC JTC 1/SC 29/WG 11, 19th Meeting, Jun. 22-Jul. 1, 2020 (97 pages).

* cited by examiner

PRUNING METHODS FOR NEURAL NETWORK BASED VIDEO CODING

CROSS-REFERENCE TO RELATED APPLICATION

This application is a Continuation Application of U.S. application Ser. No. 17/362,184 filed on Jun. 29, 2021, which claims priority from U.S. Provisional Patent Application No. 63/089,481, filed on Oct. 8, 2020, in the U.S. Patent and Trademark Office, which is incorporated herein by reference in its entirety.

FIELD

Methods and apparatuses consistent with embodiments relate to video coding, and more particularly, pruning methods and apparatuses for neural network based video coding.

BACKGROUND

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3) and 2016 (version 4). Since then, they have been studying the potential need for standardization of future video coding technology with a compression capability that significantly exceeds that of the HEVC standard (including its extensions). In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC). Meanwhile, the Audio Video coding Standard (AVS) of China is also in progress.

SUMMARY

According to embodiments, a pruning method of neural network based video coding of a current block of a picture of a video sequence is performed by at least one processor and includes categorizing parameters of a neural network into groups, setting a first index to indicate that a first group of the groups is to be pruned, and a second index to indicate that a second group of the groups is not to be pruned, and transmitting, to a decoder, the set first index and the set second index. Based on the transmitted first index and the transmitted second index, the current block is processed using the parameters of which the first group of the groups is pruned.

According to embodiments, a pruning apparatus for neural network based video coding of a current block of a picture of a video sequence includes at least one memory configured to store computer program code, and at least one processor configured to access the at least one memory and operate according to the computer program code. The computer program code includes categorizing code configured to cause the at least one processor to categorize parameters of a neural network into groups, first setting code configured to cause the at least one processor to set a first index to indicate that a first group of the groups is to be pruned, and a second index to indicate that a second group of the groups is not to be pruned, and first transmitting code configured to cause the at least one processor to transmit, to a decoder, the set first index and the set second index. Based on the transmitted first index and the transmitted second index, the current block is processed using the parameters of which the first group of the groups is pruned.

According to embodiments, a non-transitory computer-readable storage medium stores instructions that, when executed by at least one processor for pruning in neural network based video coding of a current block of a picture of a video sequence, cause the at least one processor to categorize parameters of a neural network into groups, set a first index to indicate that a first group of the groups is to be pruned, and a second index to indicate that a second group of the groups is not to be pruned, and transmit, to a decoder, the set first index and the set second index. Based on the transmitted first index and the transmitted second index, the current block is processed using the parameters of which the first group of the groups is pruned.

DETAILED DESCRIPTION

This disclosure describes video coding technologies beyond HEVC, e.g., VVC or AVS. More specifically, several Supplementary Enhancement Informations are used for neural network based image and video coding.

In VVC and AVS3, neural network based methods and apparatuses are proposed, especially a neural network based filter. Below is one of examples of a structure of the neural network based filter.

Figure 1A:
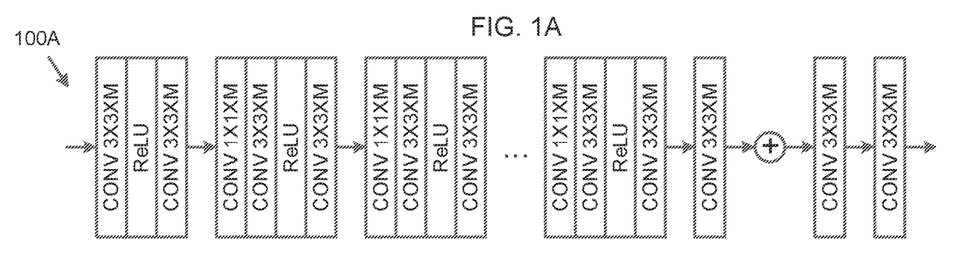
FIG. 1A is a block diagram of a neural network based filter.

FIG. 1A is a block diagram of a neural network based filter (100A).

The neural network based filter (100A) includes convolutional layers (CONV). As an example, a kernel size may be 3*3*M, which means for each channel, a convolutional kernel size may be 3*3, and an output layer number may be M.

A combination of the convolutional layers and non-linear activation functions (ReLUs) makes a whole process that can be seen as a non-linear filter for a reconstruction. After a filtering process, quality can be improved.

Figure 1B:
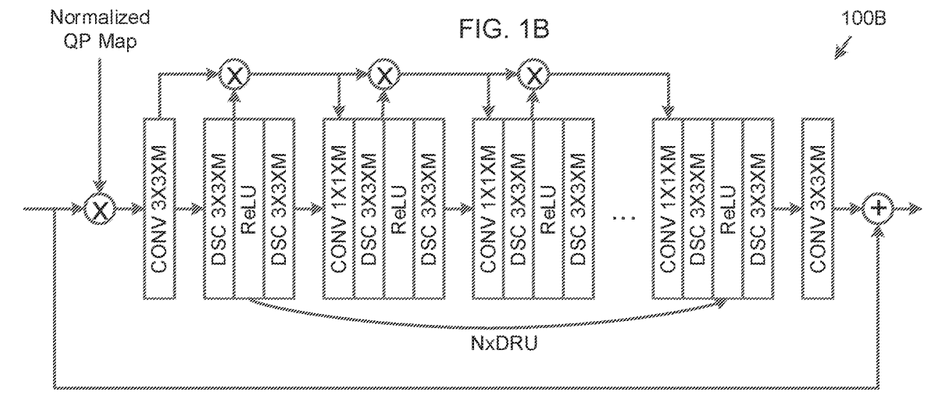
FIG. 1B is a diagram of a block diagram of a dense residual convolutional neural network based in-loop filter (DRNNLF).

FIG. 1B is a diagram of a block diagram of a DRNNLF (100B).

The DRNNLF (100B) from JVET-O0101 is an additional filter between a deblocking filter and a sample-adaptive offset (SAO). It works with the deblocking filter, the SAO, an adaptive loop filter (ALF) and a cross-component ALF (CCALF) to improve coding efficiency.

FIG. 1B shows a network structure of the DRNNLF (100B), where N and M denote a number of dense residual units (DRUs) and a convolution kernel, respectively. For example, N may be set to 4, and M may be set to 32 for a tradeoff between computational efficiency and performance. A normalized quantization parameter (QP) map is concatenated with a reconstructed frame as an input to the DRNNLF (100B).

A main body of the DRNNLF includes a series of DRUs. A structure of a DRU is shown in FIG. 1C.

Figure 1C:
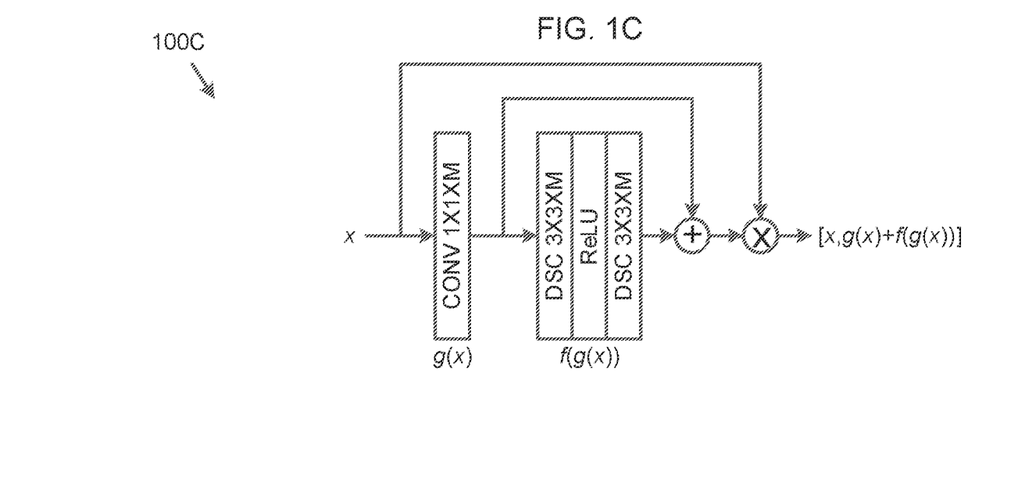
FIG. 1C is a block diagram of a dense residual unit (DRU) of the DRNNLF of FIG. 1B.

FIG. 1C is a block diagram of a DRU (100C) of the DRNNLF (100B) of FIG. 1B.

The DRU (100C) directly propagates its input to a subsequent unit through a shortcut. To further reduce a computational cost, 3×3 depth-wise separable convolutional (DSC) layers are applied in the DRU (100C).

Finally, an output of a neural network has 3 channels, which correspond to colors Y, Cb, Cr, respectively. The DRNNLF (100B) is applied to both intra and inter pictures. Additional flags are signaled to indicate an on/off of the DRNNLF (100B) at a picture level and a coding tree unit (CTU) level.

Using the DRNNLF (100B) as an example, a computation of a convolutional neural network is related to a size of a fourth-dimensional (4D) weight tensor W[n][m][h][w] in each convolution layer of the neural network, where n is a number of output filters (filter), m is a number of input channels (channel), and h×w is a size of a 2D convolution kernel. A computation of a convolution layer could be reduced by zeroing out some of coefficients in W, and therefore, reduce a number of multiply-add operations. This method of zeroing out the coefficients in W is known as pruning in neural network compression. Previously, neural network parameters, such as the number of output filters in the DRNNLF (100B) can be pruned out (set to 0).

Figure 1D:
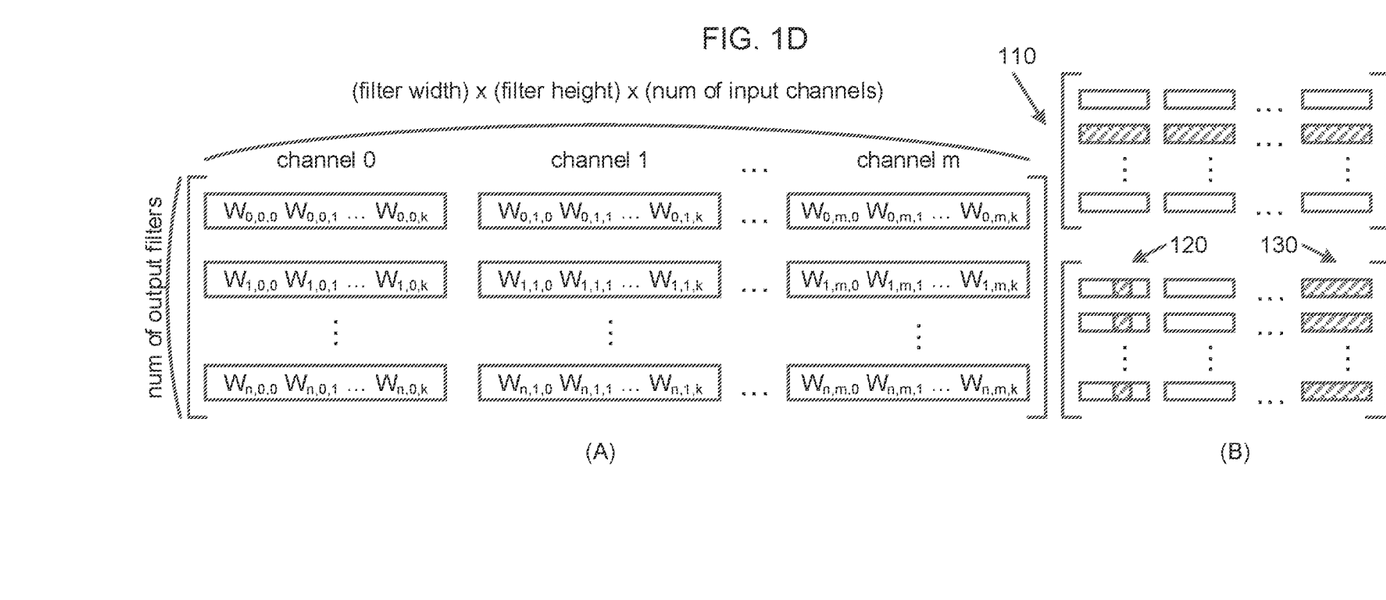
FIG. 1D is a diagram illustrating pruning of a two-dimensional (2D) array.

FIG. 1D is a diagram illustrating pruning of a 2D array.

As shown in portion (A) of FIG. 1D, the 4D weight tensor W can be unfolded as a 2D array in which each element is a 1D array including serialized filter coefficients of a h×w 2D convolution kernel. In portion (A) of FIG. 1D, columns of the 2D array correspond to input channels, and rows of the 2D array correspond to output filters.

As shown in portion (B) of FIG. 1D, the coefficients in W are pruned by filter pruning (110) or zeroing out certain rows as shaded. Consequently, both a number of multiply-adds and a size of neural network parameters can be reduced. In other approaches, similar pruning can be done by row, by column, by a position in the 1D array to reduce the number of multiple-adds, or any other proper indication of which parameters are to be set to zero can be made. For example, as shown in portion (B) of FIG. 1D, filter shape pruning (120) may include pruning a column of the 1D or 2D array, and channel pruning (130) includes pruning a channel of the 1D or 2D array. The more parameters are pruned, the less computation is needed.

Figure 2:
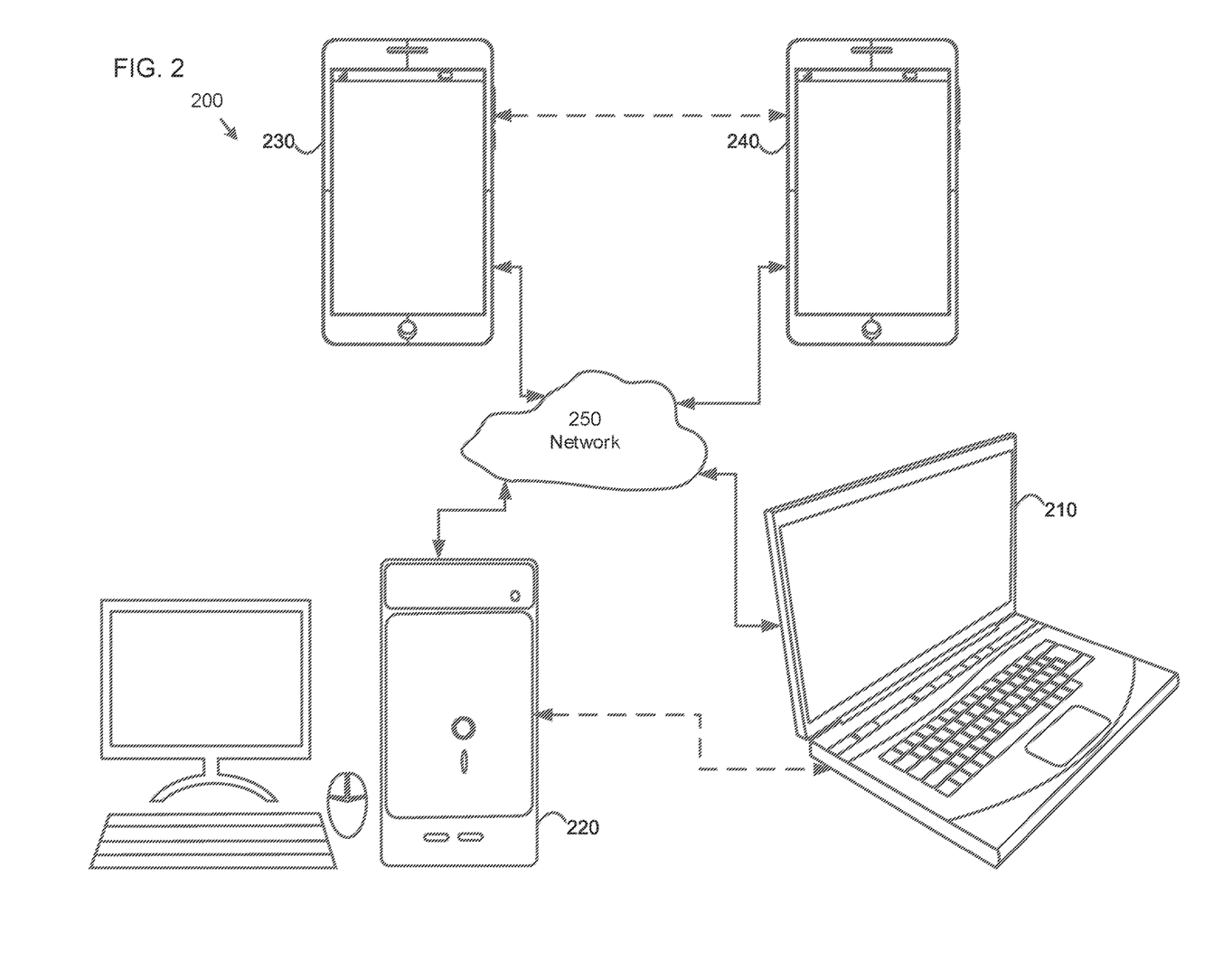
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
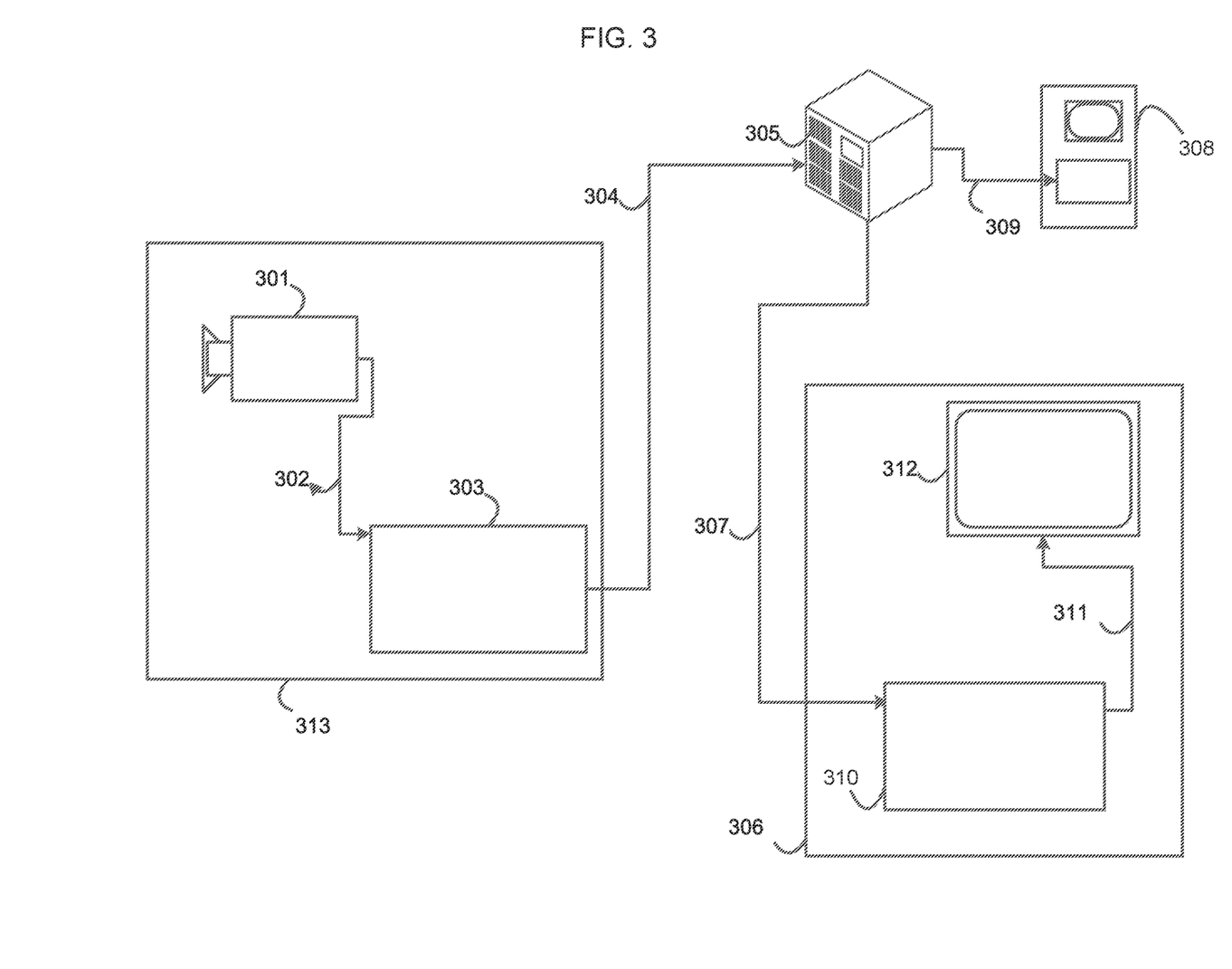
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310), which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
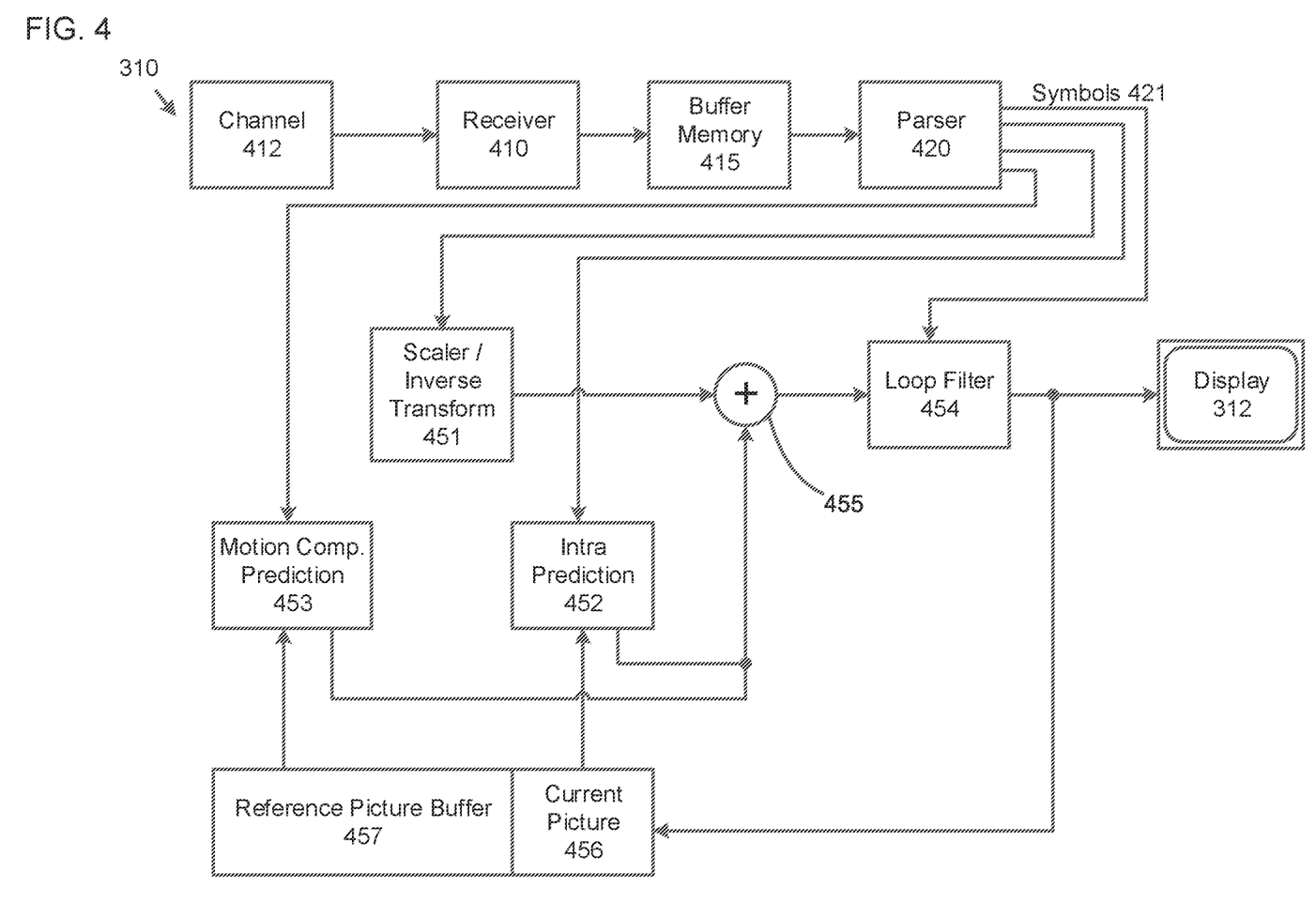
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); in the same or embodiments, one coded video sequence (CVS) at a time, where the decoding of each coded video sequence is independent from other coded video sequences. The coded video sequence may be received from a channel (412), which may be a hardware/software link to a storage device, which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplemental Enhancement Information (SEI) messages or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks including sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (457) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
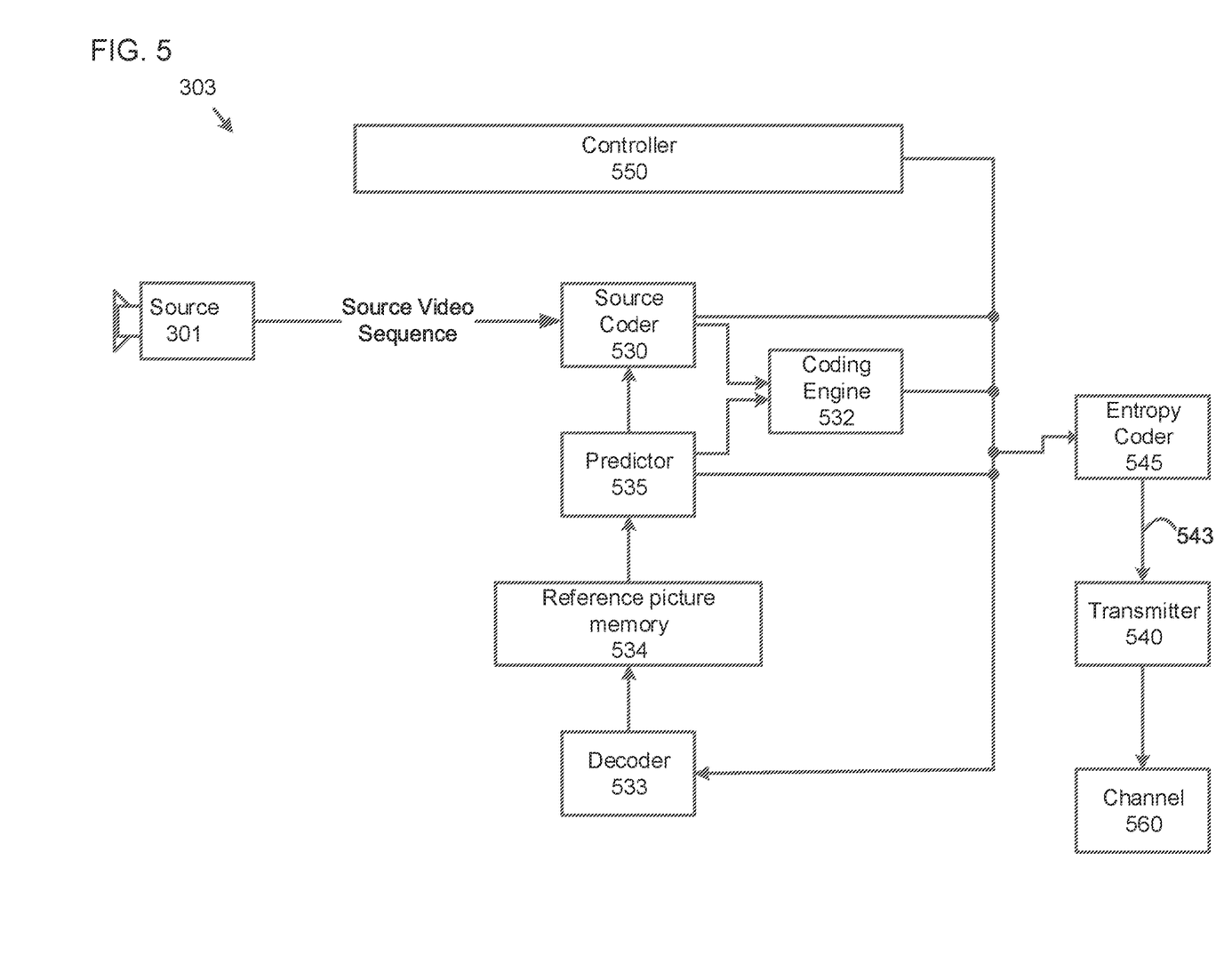
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265 or VVC H.266. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may include temporal, spatial, and/or SNR enhancement layers, other forms of redundant data such as redundant pictures and slices, SEI messages, Visual Usability Information (VUI) parameter set fragments, and so on.

Embodiments described herein include methods and apparatuses for pruning in neural network based video coding systems. Potential "to-be-pruned" parameters are referred as a neural network (NN) parameter set.

In embodiments, a binary mask can be used to indicate which part of the NN parameter set is to be pruned. Each element in the mask, as a 0 or 1 binary indicator, means if a particular row, column, or position in a group of filter coefficients, or another pre-defined one individual parameter of a group of parameters, is to be set to 0. This mask is signaled to a decoder side.

In embodiments, a grouping mechanism may be agreed to by both an encoder and a decoder. The entire NN parameter set may be categorized into groups, such as per row, per column, and per position in a set of 1D coefficients (see portion (b) of FIG. 1D), etc. A minimum operation of pruning is based on the existing groups. That is, if pruned, parameters of an entire group will be set to 0. At an encoder end, an index of the selected group is sent to indicate that the parameters in this group are pruned. In one embodiment, the index can be one single index, which ranges among all possible groups. In another embodiment, the index can be signaled in a form of a combination of several indices, assuming the NN parameter set has multiple dimensions. Each index may be used to signal a position in one dimension. In another embodiment, the encoder/decoder has a simplified choice: whether to use pruning on its NN parameter set. If pruning is chosen, then a default subset of the NN parameters will be pruned, without using an index as an indication.

Similar as in the above embodiments, the entire NN parameter set may be categorized into groups, such as per row, per column, and per position in a set of 1D coefficients (see portion (b) of FIG. 1D), etc. An importance of those to be pruned groups in the NN parameter set is prioritized, for example, from the least importance group(s) to the most important group(s). When pruning is necessary, an indication, such as a percentage of parameters to be pruned, will be sent to the decoder. By acquiring such information, the decoder can perform pruning from the least importance group(s), which is known by the decoder, until the percentage is met. In one embodiment, the sent indication may be depending on a picture type or a slice type. For example, a certain part of parameters may be more important when coding an I slice/picture than when coding a B or P slice/picture. In another example, a larger percentage of parameters may be pruned when coding a B or P slice/picture than coding an I slice/picture.

In embodiments, if more than one set of NN parameters exist in the video coding system, such as having multiple parameter sets for different modules, pruning across different sets of parameters may require proper signaling of pruning operations. In one embodiment, a number of NN parameter sets is signaled first. For each NN parameter set, a pruning index or indices for groups inside the specific NN parameter set is signaled later.

In embodiments, a pruning selection may be operated at various levels in the video coding system, for example, at a sequence level (a sequence parameter set (SPS) flag), a picture level (a picture parameter set (PPS) flag or picture header), a slice level (slice level set flag) and so on. In one embodiment, a sequence level flag is set to indicate pruning may be used in a coded bitstream. When this SPS flag is true, for each picture, a picture level flag is set to indicate if the NN parameter set in a current picture needs to be pruned. If yes, the above methods may apply. In another embodiment, a sequence level flag is set to indicate pruning may be used in the coded bitstream. When this SPS flag is true, for each picture, picture level information is set to indicate a percentage of the NN parameter set in the current picture needs to be pruned. If this value is non-zero, the above methods may apply.

In embodiments, the above pruning options and control parameters (such as operational points (which picture, etc.), selection indices, percentage to be pruned) are sent via a SEI message to indicate the optional pruning part of the NN parameter set. This is feasible especially for image coding, and the NN parameter set applies to a post-reconstruction stage in an image coding system. In that case, the decoder can choose a degree of pruning or whether to prune its own choices. The SEI message can serve as optional information to optimize decoded image quality and complexity.

Figure 6:
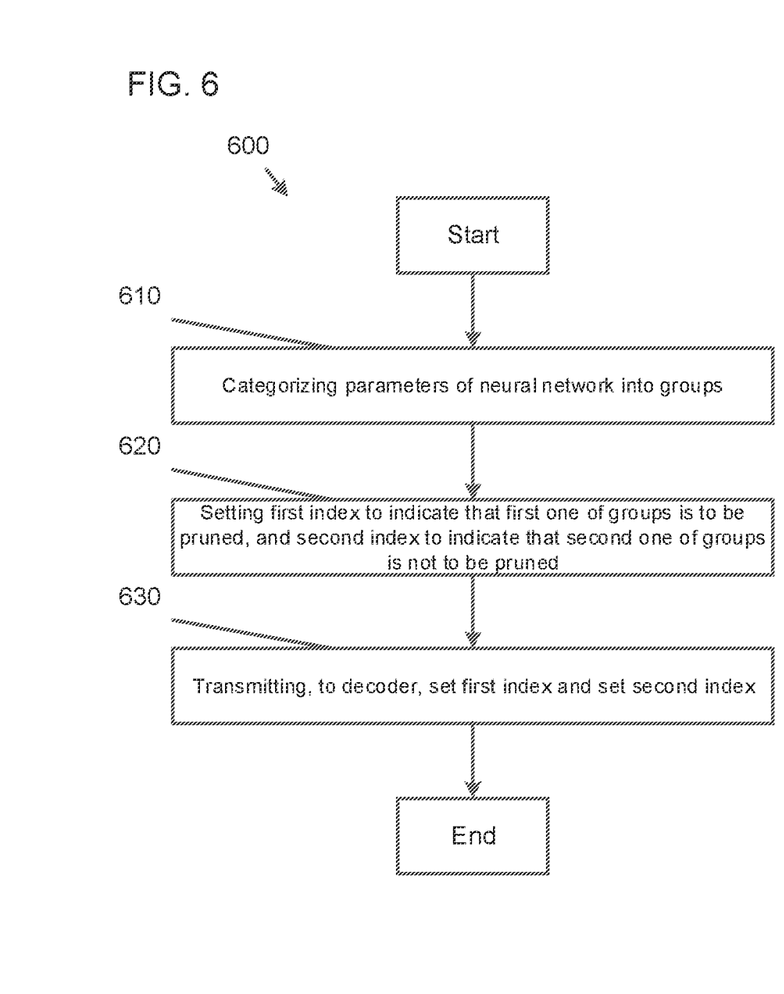
FIG. 6 is a flowchart illustrating a pruning method of neural network based video coding, according to embodiments.

FIG. 6 is a flowchart illustrating a pruning method (600) of neural network based video coding, according to embodiments. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes categorizing parameters of a neural network into groups.

In a second block (620), the method (600) includes setting a first index to indicate that a first group of the groups is to be pruned, and a second index to indicate that a second group of the groups is not to be pruned.

In a third block (630), the method (600) includes transmitting, to a decoder, the set first index and the set second index. Based on the transmitted first index and the transmitted second index, the current block is processed using the parameters of which the first group of the groups is pruned. For example, a filtering operation may be performed on the current block using the parameters of which the first group of the group is pruned.

The method (600) may further include setting a sequence parameter set (SPS) flag indicating whether pruning is performed in a coded bitstream, and based on the SPS flag being set to indicate that the pruning is performed in the coded bitstream, setting a picture parameter set (PPS) flag indicating whether one or more of the parameters of the neural network is to be pruned, and/or picture level information indicating a percentage of the parameters of the neural network to be pruned.

The method (600) may further include transmitting, to the decoder, the set PPS flag and the set picture level information. Based on the transmitted PPS flag indicating that the one or more of the parameters is to be pruned and the transmitted picture level information, the current block may be filtered using the parameters of which the percentage is pruned until the percentage is reached.

The set first index and the set second index may be transmitted to the decoder, via a supplemental enhancement information (SEI) message.

The parameters of the neural network may be arranged in a two-dimensional (2D) array, the groups into which the parameters of the neural network are categorized may include any one or any combination of a row, a column and a position of the 2D array, and the first index and the second index may be binary indicators included in a binary mask.

Figure 7:
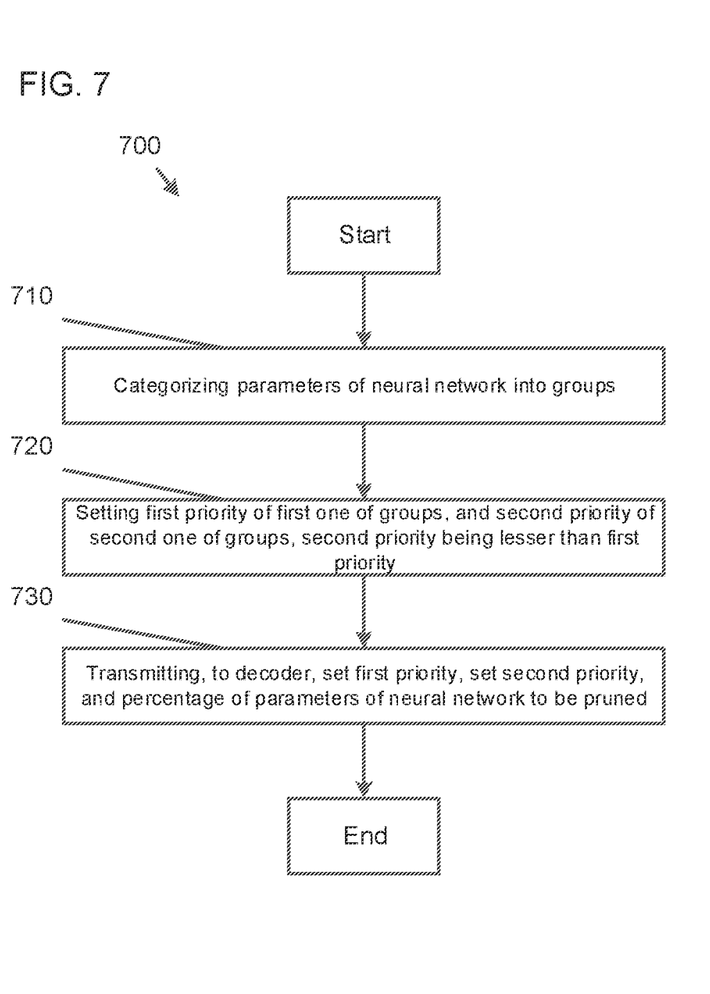
FIG. 7 is a flowchart illustrating a pruning method of neural network based video coding, according to embodiments.

FIG. 7 is a flowchart illustrating a pruning method (700) of neural network based video coding, according to embodiments. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes categorizing parameters of a neural network into groups.

In a second block (720), the method (700) includes setting a first priority of a first group of the groups, and a second priority of a second group of the groups, the second priority being lesser than the first priority.

In a third block (730), the method (700) includes transmitting, to the decoder, the set first priority, the set second priority, and a percentage of the parameters of the neural network to be pruned. The current block is processed using the parameters of which the percentage is pruned starting from the second group of the groups having the second priority, followed by the first group of the groups having the first priority and until the percentage is reached.

Based on the picture being a B or P slice or picture, the percentage of the parameters of the neural network to be pruned may be larger, and based on the picture being an I slice or picture, the percentage of the parameters of the neural network to be pruned may be smaller.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Figure 8:
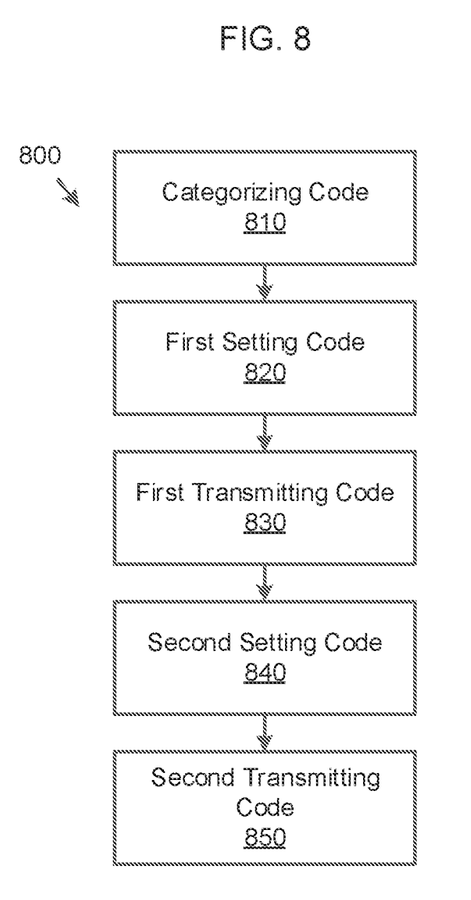
FIG. 8 is a simplified block diagram of a pruning apparatus for neural network based video coding, according to embodiments.

FIG. 8 is a simplified block diagram of a pruning apparatus (800) for neural network based video coding, according to embodiments.

Referring to FIG. 8, the apparatus (800) includes categorizing code (810), first setting code (820), first transmitting code (830), second setting code (840), second transmitting code (850).

The categorizing code (810) is configured to cause at least one processor to categorize parameters of a neural network into groups.

The first setting code (820) is configured to cause the at least one processor to set a first index to indicate that a first group of the groups is to be pruned, and a second index to indicate that a second group of the groups is not to be pruned.

The first transmitting code (830) is configured to cause the at least one processor to transmit, to a decoder, the set first index and the set second index. Based on the transmitted first index and the transmitted second index, the current block is processed using the parameters of which the first group of the groups is pruned.

The second setting code (840) may be configured to cause the at least one processor to set a first priority of the first group of the groups, and a second priority of the second group of the groups, the second priority being lesser than the first priority. The second transmitting code (850) may be configured to cause the at least one processor to transmit, to the decoder, the set first priority, the set second priority, and a percentage of the parameters of the neural network to be pruned. The current block may be filtered using the parameters of which the percentage is pruned starting from the second group of the groups having the second priority, followed by the first group of the groups having the first priority and until the percentage is reached.

Based on the picture being a B or P slice or picture, the percentage of the parameters of the neural network to be pruned may be larger, and based on the picture being an I slice or picture, the percentage of the parameters of the neural network to be pruned may be smaller.

The second setting code (840) may be configured to cause the at least one processor to set a sequence parameter set (SPS) flag indicating whether pruning is performed in a coded bitstream, and based on the SPS flag being set to indicate that the pruning is performed in the coded bitstream, set a picture parameter set (PPS) flag indicating whether one or more of the parameters of the neural network is to be pruned, and/or picture level information indicating a percentage of the parameters of the neural network to be pruned.

The second transmitting code (850) may be configured to cause the at least one processor to transmit, to the decoder, the set PPS flag and the set picture level information. Based on the transmitted PPS flag indicating that the one or more of the parameters is to be pruned and the transmitted picture level information, the current block may be processed and/or filtered using the parameters of which the percentage is pruned until the percentage is reached.

The set first index and the set second index may be transmitted to the decoder, via a supplemental enhancement information (SEI) message.

The parameters of the neural network may be arranged in a two-dimensional (2D) array, the groups into which the parameters of the neural network are categorized comprise any one or any combination of a row, a column and a position of the 2D array, and the first index and the second index are binary indicators included in a binary mask.

Figure 9:
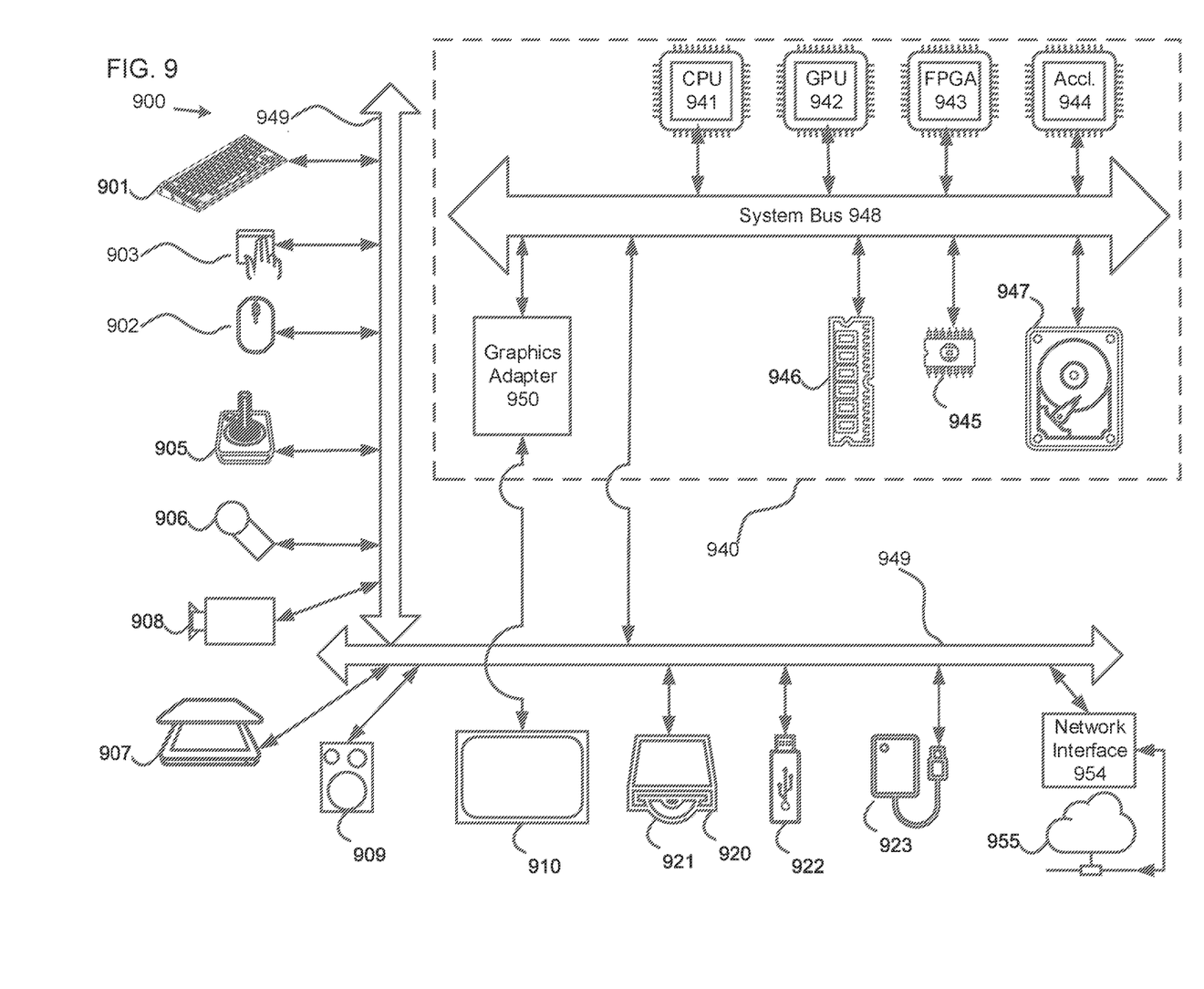
FIG. 9 is a diagram of a computer system suitable for implementing embodiments.

FIG. 9 is a diagram of a computer system (900) suitable for implementing embodiments.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are examples in nature and are not intended to suggest any limitation as to the scope of use or functionality of the computer software implementing embodiments. Neither should the configuration of components be interpreted as having any dependency or requirement relating to any one or combination of components illustrated in embodiments of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter (950) generates and outputs images to the touch-screen (910).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks (955) commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface (954) into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A pruning apparatus for neural network based video coding of a current block of a picture of a video sequence, the pruning apparatus comprising:
  at least one memory configured to store computer program code; and
  at least one processor configured to access the at least one memory and operate according to the computer program code, the computer program code comprising:
    first setting code configured to cause the at least one processor to set a sequence level flag indicating whether pruning is to be performed in a coded bitstream;
    second setting code configured to cause the at least one processor to, based on the sequence level flag indicating that pruning is to be performed in the coded bitstream, set, for each picture in the coded bitstream, a picture level flag that indicates that one or more neural network parameters associated with a respective picture are to be pruned;
    first transmitting code configured to cause the at least one processor to transmit, to a decoder, a total number of groups of parameters; and second transmitting code configured to cause the at least one processor to transmit, to the decoder, the sequence level flag and the respective picture level flag, wherein, based on the respective picture level flag, the respective pictures are processed using non-pruned parameters.

2. The pruning apparatus of claim 1, wherein the sequence level flag is set in a sequence parameter set (SPS), and wherein based on the SPS flag being set to indicate that the pruning is performed in the coded bitstream, the picture level flag is set in a picture parameter set (PPS) flag, and wherein the PPS flag indicates a percentage of the parameters of the neural network to be pruned.

3. The pruning apparatus of claim 1, wherein a first index and a second index are transmitted to the decoder, via a supplemental enhancement information (SEI) message.

4. The pruning apparatus of claim 1, wherein the parameters of the neural network are arranged in a two-dimensional (2D) array, a plurality of parameter groups into which the parameters of the neural network are categorized comprise any one or any combination of a row, a column and a position of the 2D array, and a first index and a second index are binary indicators included in a binary mask.

5. A pruning method of neural network based video decoding of a current block of a picture of a video sequence, the method being performed by at least one processor, and the method comprising:

obtaining a sequence level flag indicating whether pruning is to be performed in a coded bitstream;

based on the sequence level flag indicating that pruning is to be performed in the coded bitstream, obtaining, for each picture in the coded bitstream, a picture level flag that indicates that one or more neural network parameters associated with a respective picture are to be pruned;

obtaining a total number of groups of parameters; and obtaining the sequence level flag and the respective picture level flag, wherein, based on the respective picture level flag, the respective pictures are decoded using non-pruned parameters.

6. The method of claim 5, wherein the sequence level flag is set in a sequence parameter set (SPS), and wherein based on the SPS flag being set to indicate that the pruning is performed in the coded bitstream, the picture level flag is set in a picture parameter set (PPS) flag, and wherein the PPS flag indicates a percentage of the parameters of the neural network to be pruned.

7. The method of claim 5, wherein a first index and a second index are received by a decoder, via a supplemental enhancement information (SEI) message.

8. The method of claim 5, wherein the parameters of the neural network are arranged in a two-dimensional (2D) array, a plurality of parameter groups into which the parameters of the neural network are categorized comprise any one or any combination of a row, a column and a position of the 2D array, and a first index and a second index are binary indicators included in a binary mask.

9. A method of pruning for neural network based video coding of a current block of a picture of a video sequence, the method being performed by at least one processor, and the method comprising:

performing a conversion between a visual media file and a bitstream of a visual media data according to a format rule, the format rule indicating that the bitstream comprises a plurality of syntax elements and to implement:

determining a sequence level flag indicating whether pruning is to be performed in a coded bitstream;

based on the sequence level flag indicating that pruning is to be performed in the coded bitstream, determining, for each picture in the coded bitstream, a picture level flag that indicates that one or more neural network parameters associated with a respective picture are to be pruned;

receiving, by a decoder, a total number of groups of parameters; and receiving, by the decoder, the sequence level flag and the respective picture level flag, wherein, based on the respective picture level flag, pictures are processed using non-pruned parameters.

10. The method of claim 9, wherein the sequence level flag is set in a sequence parameter set (SPS), and wherein based on the SPS flag being set to indicate that the pruning is performed in the coded bitstream, the picture level flag is set in a picture parameter set (PPS) flag, and wherein the PPS flag indicates a percentage of the parameters of the neural network to be pruned.

11. The method of claim 9, wherein a first index and a second index are received by the decoder, via a supplemental enhancement information (SEI) message.

12. The method of claim 9, wherein the parameters of the neural network are arranged in a two-dimensional (2D) array, a plurality of parameter groups into which the parameters of the neural network are categorized comprise any one or any combination of a row, a column and a position of the 2D array, and a first index and a second index are binary indicators included in a binary mask.

* * * * *